United States Patent [19]
Hope et al.

[11] 3,764,584
[45] Oct. 9, 1973

[54] CURABLE COMPOSITIONS
[75] Inventors: Paul Hope, Walden; Richard John Martin; Bernard Peter Stark, both of Cambridge, all of England
[73] Assignee: Ciba-Geigy AG, Basel, Switzerland
[22] Filed: Nov. 17, 1971
[21] Appl. No.: 199,786

[30] Foreign Application Priority Data
Nov. 19, 1970 Great Britain.................. 55,106/70

[52] U.S. Cl........ 260/78.4 EP, 260/2 EP, 260/2 EA
[51] Int. Cl............................................. C08g 30/12
[58] Field of Search......... 260/2 EP, 2 EA, 78.4 EP, 260/346.3, 348 R, 348 A

[56] References Cited
UNITED STATES PATENTS
3,598,749   8/1971   Cheng et al........................ 252/182
FOREIGN PATENTS OR APPLICATIONS
2,000,323   9/1969   France

*Primary Examiner*—Joseph L. Schofer
*Assistant Examiner*—John Kight
*Attorney*—Karl F. Jorda et al.

[57] ABSTRACT

Compositions comprising a. a diglycidyl ester of formula

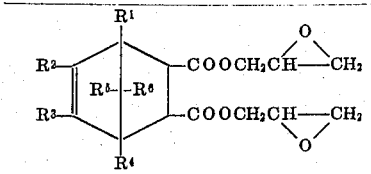

and b. a polycarboxylic anhydride of formula

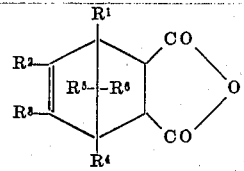

where, in each formula, one of $R^1$ to $R^6$ is a hydrogen atom or a methyl or allyl group and the remaining R's denote hydrogen atoms, on being cured, show a very high thermal resistance and may be used as laminating resins, surface-coating resins, dipping resins, casting resins, adhesives, and potting and insulating materials for the electrical industry.

6 Claims, No Drawings

CURABLE COMPOSITIONS

This invention relates to curable compositions containing a diglycidyl ester of bicyclo[2.2.1]heptenedicarboxylic acid.

It is known that epoxy resins (which are substances containing more than one 1,2-epoxide group per molecule) can be cured, i.e., converted into insoluble, infusible, cross-linked materials. These materials have valuable technical properties. Particularly when polycarboxylic acids or their anhydrides are used as the curing agents, products with a high degree of resistance to elevated temperatures can be obtained. However, the compositions hitherto available in general do not meet the more rigorous requirements of resistance to heat.

We have now found that, by choice of certain combinations of epoxide resins, viz. diglycidyl bicyclo[2.2.1]-hept-5-ene-2,3-dicarboxylates, and curing agents, there can be made compositions which, on being cured, exhibit very high thermal resistance, as shown by the level of their temperatures of deflection under load.

This invention accordingly provides curable compositions comprising:

a. a diglycidyl ester of formula

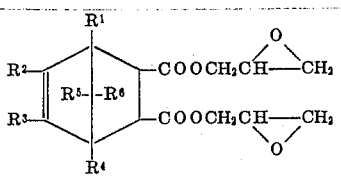

and b. a polycarboxylic anhydride of formula

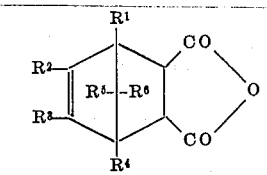

where, in each formula, one of $R^1$ to $R^6$ is a hydrogen atom or a methyl or allyl group and the remaining R's denote hydrogen atoms.

There are also provided the products obtained by curing such compositions.

Diglycidyl bicyclo[2.2.1]hept-5-ene-2,3-dicarboxylate is a known compound (see e.g., German Auslegeschrift No. 1,245,369), and is obtainable by reaction of maleic anhydride with cyclopentadiene to form bicyclo[2.2.1]hept-5-ene-2,3-dicarboxylic anhydride followed by conversion of the latter into its diglycidyl ester by conventional methods. Similarly, methylcyclopentadiene or allylcyclopentadiene yield, with maleic anhydride, the bicyclic anhydride which, too, can be converted into the diglycidyl ester. Diglycidyl allylbicyclo[2.2.1]hept-5-ene-2,3-dicarboxylate is believed to be a new compound. (It will be appreciated that no specific location can be assigned for the methyl or allyl group in methycyclopentadiene or allycyclopentadiene, since the commercial materials consist of mixtures which may isomerise; from this it follows that specific locations cannot be assigned in the adducts with maleic anhydride, either).

The compositions may contain catalysts for the curing reaction; these may be tertiary amines, tertiary amine salts, complexes of tertiary amines with boron trichloride, quaternary ammonium compounds, or sodium alkoxides (e.g., 2,4,6-tris(dimethylaminomethyl)-phenol, N-benzyldimethylamine, imidazoles and their salts with fatty acids, such as 1-methylimidazole, 2-ethyl-4-methylimidazole, and 1-methylimidazole 2-ethylhexanoate, 4-aminopyridine, boron trichloride-trimethylamine complex, triamylammonium phenoxide, or the sodium derivative of 2,4-dihydroxy-3-hydroxymethylpentane).

The proportions to be used of the anhydride and the diglycidyl ester can vary according to the particular requirements and the properties sought of the curable and cured compositions: usually, from 0.6 to 1.1, and especially from 0.75 to 0.95, anhydride equivalents of the carboxylic acid anhydride are used per 1,2-epoxide equivalent of the diglycidyl ester. To obtain high deflection temperature values, e.g., of 200° C or higher, it is advisable to heat the compositions at a temperature of 175° to 275° C for at least 1 hour.

The compositions of this invention may contain additives such as extenders, reinforcing agents and fillers, colouring matter, flow control agents, flame inhibitors, and mould lubricants. Suitable extenders, reinforcing agents, and fillers are, for example, asphalt, bitumen, glass fibres, carbon fibres, asbestos fibres, mica, quartz flour, cellulose, kaolin, wollastonite, colloidal silica such as that available under the registered Trade Mark "Aerosil," and powdered metals such as aluminium. They may be used as laminating resins, surface-coating resins, dipping resins, casting resins, adhesives, and potting and insulating materials for the electrical industry, and also in the manufacture of such products.

In the following Examples which illustrate the invention, parts are by weight (unless otherwise specified) and temperatures are in degrees Centigrade. Temperatures of deflection under load were determined according to British Standard Specification 2782, Method 102G. The term "Martens point," unless otherwise specified, denotes the heat deflection temperature under load as determined by a modification of the Martens D.I.N. procedure. A smaller sample, 76 mm × 19 mm × 3.2 mm (compared with a sample size of 120 mm × 15 mm × 10 mm specified in the D.I.N. procedure) and a maximum fibre stress of 12.5 kg./sq. cm. (compared with the specified 50 kg./sq.cm) were employed. Such results, while not necessarily the same as those which would be obtained by the original D.I.N. procedure, are, however, mutually comparable.

The diglycidyl bicyclo[2.2.1]hept-5-ene-2,3-dicarboxylate used was prepared as follows.

Bicyclo[2.2.1]hept-5-ene-2,3-dicarboxylic acid (182g, 2 equiv.), epichlorohydrin (2,400 g, 26 equiv.) and tetraethylammonium bromide (3 g) as catalyst were warmed with stirring in an atmosphere of nitrogen. At about 100° an easily controllable exothermic reaction set in and the temperature rose to 114°, then fell and was maintained at 100 to 105° for a further hour, by which time the mixture was a clear, golden-yellow liquid. With the mixture at a temperature of 100°, a solution of sodium hydroxide (104 g, 2.6 equiv., i.e., 30 percent excess) in water (100 ml) was added dropwise, and the water introduced, together with that formed during the reaction, was removed by azeotropic distillation. Epichlorohydrin removed was continuously returned to the reaction vessel, and the rate of adding the sodium hydroxide solution was therefore dependent on the rate at which water could be removed from the reaction mixture. Addition took 100 to 120 minutes and, at completion, the mixture was quickly warmed to 107°, after which it was rapidly cooled in an ice bath. The volume of water removed from the reaction mixture was 120 ml (calculated value 136 ml).

The mixture was filtered to remove sodium chloride and the epichlorohydrin was removed from the filtrate by distillation in vacuo. The residue was dissolved in benzene (1,000 ml), washed four times with an equal volume of water, and dried with anhydrous sodium sulphate.

Sodium sulphate was removed by filtration and the benzene was distilled off in vacuo. The residue, consisting essentially of diglycidyl bicyclo[2.2.1]hept-5-ene-2,3-dicarboxylate, was a golden brown liquid of medium viscosity and weighed 261g (calculated yield, 294g). It had an epoxide content of 5.61 equiv./kg. (82.5 percent of the calculated value, 6.80 equiv./kg).

The diglycidyl methylbicyclo[2.2.1]hept-5-ene-2,3-dicarboxylate used was prepared as follows.

Methylbicyclo[2.2.1]hept-5-ene-2,3-dicarboxylate anhydride (178 g, 2 acid equiv.), epichlorohydrin (833 g, 9 equiv.) and water (72 g, 4 equiv.) were warmed with stirring to 85° C and held at this temperature for 1 hour. A 50 percent aqueous solution of tetramethylammonium chloride (10g) was then added, the mixture was heated to reflux and water was removed azeotropically. The pH of the solution, which was observed by means of an electrode immersed in the solution, rose steadily from its original value of 1.0. When the pH value reached 7.6, the mixture was quickly cooled and a further quantity of epichlorohydrin (833 g, 9 equiv.) was added. The solution was then warmed with stirring under an atmosphere of nitrogen and at a temperature of 100° C, a solution of sodium hydroxide (104 g, 2.6 equiv.) in water (100 ml) was added dropwise, while the water introduced, together with that formed during the reaction, was removed azeotropically. At completion of the addition, which took about 60 minutes, the mixture was rapidly cooled and the sodium chloride was removed by filtration. The filtrate was washed once with an equal volume of water and dried over anhydrous sodium sulphate. The sodium sulphate was removed by filtration and the epichlorohydrin was distilled off in vacuo. The residue, which consisted essentially of diglycidyl methylbicyclo[2.2.1]hept-b 5-ene-2,3-dicarboxylate, was a golden-brown liquid of medium viscosity and weighed 247g (calculated value 308 g): its epoxide content was 4.95 equiv./kg (calculated value 6.49 equiv./kg).

EXAMPLE I

A mixture of diglycidyl bicyclo[2.2.1]hept-5-ene-2,3-dicarboxylate (I) (100 parts), methylbicyclo[2.2.1]hept-5-ene-2,3-dicarboxylic anhydride (II) (90 parts), and 1-methylimidazole (1 part) as catalyst was heated for 16 hours at 100° followed by for 2 hours at 150°: the deflection temperature of the product was 115°. On further heating the product for 2 hours at 260°, the deflection temperature rose to 283°.

For purposes of comparison, a mixture containing 100 parts of diglycidyl cyclohex-4-ene-1,2-dicarboxylate (III), i.e., the unbridged analogue of I, 100 parts of II (a larger proportion of the curing agent being required because of the higher epoxide content per unit mass of III), and 1 part of methylimidazole was subjected to the same cure cycle. After being heated at 100° and then at 150°, the samples had a deflection temperature of 120°, i.e., 5° higher than those prepared from I. But when the samples were heated further at 260°, their deflection temperature reached only 183°, i.e., 100° lower than that of the cured compositions of this invention.

In other experiments, a mixture containing 100 parts of I, 90 parts of II, and 0.2 part of N-benzyldimethylamine was heated for 4 hours at 100°, then 2 hours at 150°, and 2 hours at 260°. The temperature of deflection under load of the cured specimen was more than 250°. A mixture containing 100 parts of I, 90 parts of II, and 2 parts of imidazole 2-ethylhexanoate was heated for 3 hours at 100°, 2 hours at 150°, and 4 hours at 180°, at which time the deflection temperature of the specimen was 126°: after the sample had been exhaustively cured by being heated for a further 336 hours at 190° C, its distortion temperature had risen to 244° C. On the other hand, the corresponding values of samples prepared from 100 parts of III, 100 parts of II, and 2 parts of imidazole 2-ethylhexanoate were 129° and 155°: this shows that, even with exhaustive curing, the deflection temperature of the comparative sample never approached that of a sample prepared from a composition of this invention.

EXAMPLE 2

A mixture comprising 100 parts of I, 100 parts of allylbicyclo-[2.2.1]hept-5-ene-2,3-dicarboxylic anhydride, and 1 part of N-benzyldimethylamine was cast into a mould and cured by heating for 16 hours at 155° and then 16 hours at 200° C. The temperature of deflection under load of the cured specimen was 241°.

EXAMPLE 3

A mixture of 44 parts of diglycidyl methylbicyclo[2.2.1]hept-5-ene-2,3-dicarboxylate, 36 parts of (II), and 0.8 part of N-benzyldimethylamine was cured by heating for 4 hours at 100°, 2 hours at 145°, and then at 260°. The Martens point of the sample rose as follows:

| after curing for (hours at 260°) | Martens point °C |
|---|---|
| 2 | 163 |
| 3 | 207 |
| 4 | 218 |
| 5 | 233 |
| 6 | 264 |
| 8 | 285 |

EXAMPLE 4

Compositions were prepared as indicated in the following Table, and cured by heating for 1 hour at 100° C, 1 hour at 150° C, and the 2 hours at 260° C:

| | Parts by weight | | | | |
|---|---|---|---|---|---|
| | a | b | c | d | e |
| Diglycidyl bicyclo[2.2.1]hept-5-ene-2,3-dicarboxylate (I) | 100 | 100 | | | |
| Diglycidyl cyclohex-4-ene-1,2-dicarboxylate (III) | | | 100 | | |
| Diglycidyl ether of bisphenol A (5.2 epoxide equiv./kg.) | | | | 100 | 100 |
| Methylbicyclo[2.2.1]hept-5-ene-2,3-dicarboxylic anhydride (II) | 90 | | 100 | 100 | 80 |
| Cyclohexane-1,2-dicarboxylic acid anhydride | | 90 | | | |
| 1-methylimidazole | 0.5 | 0.5 | 0.5 | 0.5 | 0.5 |
| Deflection temperature, °C | >255 | 148 | 185 | 91 | 182 |
| Weight loss after 14 days at 230° C., percent (130 x 12 x 6 mm. specimens in a fanned oven) | 5.8 | *19.8 | 13.6 | *28.5 | 3.9 |

* Specimen ablated.

Composition *a* is a composition of this invention, while compositions *b, c, d,* and *e* were prepared for purposes of comparison. Composition *b* contains the same epoxide resin, (I), as does *a*, but the anhydride used does not contain the bicyclo[2.2.1]hept-5-ene ring. Composition *c* contains the anhydride II but the unbridged analogue of I, namely III; composition *d* contains the anhydride II and the most commonly employed epoxide resin, a diglycidyl ether of 2,2-bis(4-hydroxyphenyl)propane. Although compositions *c, d,* and *e* contain respectively, 100, 100, and 80 parts by weight of the curing agent, the results obtained are comparable to those obtained with compositions *a* and *b,* the ratios employed reflecting the difference in epoxide content per unit weight of the epoxide resins and the molecular weights of the curing agents.

The product obtained by curing a composition of this invention, i.e., composition *a*, had a very high heat deflection temperature under load: it also proved to have good electrical properties at high temperatures, the power factor at 1 kHz over the range 20° – 200° C being less than 0.01. The thermal stability at 230° C was comparable with that of cured composition *e*, while having a far higher deflection temperature, and was much better than those of the products obtained by curing the comparable compositions *b* and *d*.

We claim:
1. a curable composition comprising
   a. a diglycidyl ester of formula

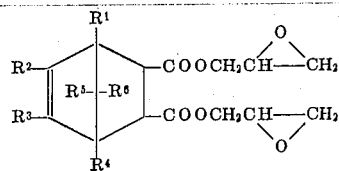

and
   b. a polycarboxylic anhydride of formula

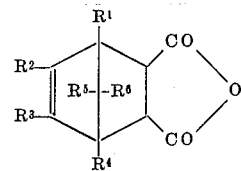

where, in each formula, one of $R^1$ to $R^6$ is selected from the group consisting of a hydrogen atom, a methyl and an allyl group, and the remaining R's denote hydrogen atoms, in sufficient quantity to provide from 0.6 to 1.1 anhydride equivalents per 1,2-epoxide equivalent of the diglycidyl ester (a).

2. The compositions according to claim 1, containing from 0.75 to 0.95 anhydride equivalents of the carboxylic acid anhydride (b) per 1,2-epoxide equivalent of the diglycidyl ester (a).

3. The compositions according to claim 1, comprising diglycidyl bicyclo[2.2.1]hept-5-ene-2,3-dicarboxylate and methylbicyclo[2.2.1]hept-5-ene2,3-dicarboxylic anhydride.

4. The compositions according to claim 1, comprising diglycidyl bicyclo[2.2.1]hept-5-ene-2,3-dicarboxylate and allylbicyclo[2.2.1]hept-5-ene-2,3-dicarboxylic anhydride.

5. The compositions according to claim 1, comprising diglycidyl methylbicyclo[2.2.1]hept-5-ene-2,3-dicarboxylate and methylbicyclo 2.2.1 hept-5-ene-2,3-dicarboxylic anhydride.

6. Cured products obtained by heating a composition as claimed in claim 1 at a temperature of from 175° to 275° C.

* * * * *